United States Patent
Walker

(10) Patent No.: US 8,933,000 B2
(45) Date of Patent: Jan. 13, 2015

(54) CORROSION INHIBITOR FOR ACID STIMULATION SYSTEMS

(75) Inventor: Michael L. Walker, Sugar Land, TX (US)

(73) Assignee: Baker Hughes Incorporated, Houston, TX (US)

( * ) Notice: Subject to any disclaimer, the term of this patent is extended or adjusted under 35 U.S.C. 154(b) by 264 days.

(21) Appl. No.: 12/878,672

(22) Filed: Sep. 9, 2010

(65) Prior Publication Data

US 2011/0065614 A1 Mar. 17, 2011

Related U.S. Application Data

(60) Provisional application No. 61/241,596, filed on Sep. 11, 2009.

(51) Int. Cl.
C09K 8/54 (2006.01)
E21B 43/25 (2006.01)
C09K 8/74 (2006.01)

(52) U.S. Cl.
CPC ... *C09K 8/54* (2013.01); *C09K 8/74* (2013.01); *C09K 2208/32* (2013.01); *Y10S 507/933* (2013.01); *Y10S 507/934* (2013.01); *Y10S 507/939* (2013.01)
USPC .......... 507/268; 507/933; 507/934; 507/939; 166/307

(58) Field of Classification Search
USPC ................. 507/933, 934, 939, 268; 166/307
See application file for complete search history.

(56) References Cited

U.S. PATENT DOCUMENTS

| | | | |
|---|---|---|---|
| 1,809,041 A | 6/1931 | Jenkins et al. | |
| 2,993,863 A | 7/1961 | Monroe et al. | |
| 3,075,938 A | 1/1963 | Johnson | |
| 3,260,673 A | 7/1966 | Fisher | |
| 3,773,465 A | 11/1973 | Keeney et al. | |
| 3,816,322 A | 6/1974 | Griffin et al. | |
| 4,719,001 A | 1/1988 | Dvoracek | |
| 4,734,259 A * | 3/1988 | Frenier et al. | 422/16 |
| 4,927,519 A | 5/1990 | Forester | |
| 5,697,443 A | 12/1997 | Brezinski et al. | |
| 5,853,565 A | 12/1998 | Cayton | |
| 5,958,849 A | 9/1999 | Hewson et al. | |
| 2003/0183808 A1 | 10/2003 | Walker et al. | |
| 2005/0263439 A1 | 12/2005 | Stark et al. | |
| 2006/0186380 A1 | 8/2006 | Walker et al. | |
| 2007/0069182 A1 * | 3/2007 | Cassidy et al. | 252/387 |
| 2008/0099722 A1 | 5/2008 | Stark et al. | |
| 2008/0146464 A1 | 6/2008 | Malwitz | |

FOREIGN PATENT DOCUMENTS

EP 0577060 A2 1/1994

OTHER PUBLICATIONS

Southwick, P. et al., "The Morpholine-Iodophenylacetylene Adduct or Charge-Transfer Complex. Formation and Conversion to N-Styrylmorpholine," Department of Chemistry, Carnegie Institute of Technology, Schenley Park, Pittsburgh 13, Pennsylvania, Sep. 1962.
EP Application No. 10816198.5 (PCT/US2010048516)—EP Search Report dated Jun. 21, 2013.

\* cited by examiner

*Primary Examiner* — Aiqun Li
(74) *Attorney, Agent, or Firm* — Mossman, Kumar & Tyler, P.C.

(57) ABSTRACT

An oil well being subjected to an acid stimulation may be treated with a corrosion inhibitor including an Ammonium Iodide Ion Source, a first carbonyl containing compound having a general formula:

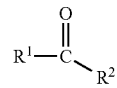

and a second carbonyl containing compound having the general formula:

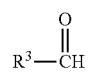

wherein $R^1$ is an alkyl or aromatic group, $R^2$ is a hydrogen, alkyl or aromatic group, and $R^3$ is a hydrogen or an alkyl group having from 1 to 6 carbons; and wherein the alkyl or aromatic groups of $R^1$, $R^2$, or $R^3$ may further comprise a nitrogen, phosphorous, halogen or second oxygen moiety; and wherein the oil well being treated has zone being treated at a temperature of from about 90 to about 500° F.

3 Claims, No Drawings

CORROSION INHIBITOR FOR ACID STIMULATION SYSTEMS

CROSS REFERENCE TO RELATED APPLICATIONS

This application claims priority to the U.S. Provisional Patent Application having the Ser. No. 61/241,596 which was filed on Sep. 11, 2009, the contents of which are fully incorporated herein by reference.

BACKGROUND OF THE INVENTION

1. Field of the Invention

The invention relates to a corrosion inhibitor. The invention particularly relates to a corrosion inhibitor for use during the acid stimulation of an oil well.

2. Background of the Art

The production of oil and gas is often controlled by the rate at which oil and gas can be extracted from the subterranean formations containing them. No matter how much oil and gas is present, unless the oil and gas can flow to a well bore for removal at a commercially practical rate, it is has no value. One means for improving the rate at which oil and gas may be removed from a subterranean formation is the use of acidizing and fracturing treatments.

Such treatments use aqueous acidic solutions and are commonly carried out in hydrocarbon-containing subterranean formations to accomplish a number of purposes, one of which is to increase the permeability of the formation. The increase in formation permeability normally results in an increase in the recovery of hydrocarbons from the formation.

In acidizing treatments, aqueous acidic solutions are introduced into the subterranean formation under pressure so that the acidic solution flows into the pore spaces of the formation. The acidic solution reacts with acid-soluble materials contained in the formation which results in an increase in the size of the pore spaces and an increase in the permeability of the formation. Similarly, in fracture-acidizing treatments, one or more fractures are produced in the formation and the acidic solution is introduced into the fracture to etch flow channels in the fracture face. The acid also enlarges the pore spaces in the fracture face and in the formation.

The rate at which acidizing fluids react with reactive materials in the subterranean formation is a function of various factors including but not limited to acid concentration, temperature, fluid velocity and the type of reactive material encountered. Whatever the rate of reaction of the acidic solution, the solution can be introduced into the formation only a certain distance before it becomes spent. It is desirable to maintain the acidic solution in a reactive condition for as long a period of time as possible to maximize the permeability enhancement produced by the acidic solution.

The use of acids downhole is not without problems. One such problem is that the acids, in addition to increasing the permeability of a hydrocarbon bearing formation, may also cause excessive corrosion of the downhole metal equipment. Anything made of metal in contact with the acid may be subject to such excessive corrosion. It would be desirable in the art to use corrosion inhibitors to limit the corrosion of metal downhole during acid stimulation treatments of oil and gas wells.

SUMMARY

In one aspect, the invention is a corrosion inhibitor including: a source of ammonium and iodide ions, a first carbonyl containing compound having a general formula:

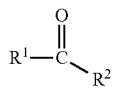

and a second carbonyl containing compound having the general formula:

wherein, the first carbonyl containing compound and the second carbonyl containing compounds are different, $R^1$ is an alkyl or aromatic group, $R^2$ is a hydrogen, alkyl or aromatic group, and $R^3$ is a hydrogen or an alkyl group having from 1 to 6 carbons; and wherein the alkyl or aromatic groups of $R^1$, $R^2$, or $R^3$ may further comprise a nitrogen, phosphorous, or halogen or second oxygen moiety.

In another aspect, the invention is a method of acidizing an oil well including using a corrosion inhibitor including: a source of ammonium and iodide ions, a first carbonyl containing compound having a general formula:

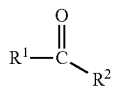

and a second carbonyl containing compound having the general formula:

wherein the first carbonyl containing compound and the second carbonyl containing compounds are different, $R^1$ is an alkyl or aromatic group, $R^2$ is a hydrogen, alkyl or aromatic group, and $R^3$ is a hydrogen or an alkyl group having from 1 to 6 carbons; and wherein the alkyl or aromatic groups of $R^1$, $R^2$, or $R^3$ may further comprise a nitrogen, phosphorous, or halogen or second oxygen moiety.

In still another aspect, the invention is a method of acidizing an oil well including using a corrosion inhibitor including: a source of ammonium and iodide ions, a first carbonyl containing compound having a general formula:

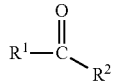

and a second carbonyl containing compound having the general formula:

wherein the first carbonyl containing compound and the second carbonyl containing compounds are different, $R^1$ is an alkyl or aromatic group, $R^2$ is a hydrogen, alkyl or aromatic group, and $R^3$ is a hydrogen or an alkyl group having from 1 to 6 carbons; and wherein the alkyl or aromatic groups of $R^1$, $R^2$, or $R^3$ may further comprise a nitrogen, phosphorous, or halogen or second oxygen moiety; and wherein the oil well being treated has zone being treated at a temperature of from about 100 to about 500° F.

DETAILED DESCRIPTION

In one embodiment, the invention may be a corrosion inhibitor including a source of ammonium ions and iodide ions; for example ammonium iodide. While "plain" or "pure" ammonium iodide is one desirable ion source, for the purposes of this application, the term "Ammonium Iodide Ion Source" means a source of ammonium ions and iodide ions including both single chemical compounds and mixture of chemical compounds. The ammonium cations of the Ammonium Iodide Ion Source may also be substituted ammonium cations. For example, methyl ammonium iodide, and other ammonium iodide salts where the ammonium cation is substituted with one or two alkyl groups having from 1 to 4 carbons may be used with the methods of the application. Mixed salts, such as sodium iodide and $NH_4Cl$ may be used. In one embodiment, $NH_4^+I_3^-$ may be used. In another embodiment, the Ammonium Iodide Ion Source may be ethyl ammonium iodide.

The corrosion inhibitor may also include two carbonyl containing compounds where the first carbonyl containing compound and the second carbonyl containing compounds are different. The first carbonyl containing compound has a general formula:

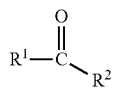

wherein $R^1$ is an alkyl or aromatic group and $R^2$ is a hydrogen, alkyl or aromatic group. In some embodiments both $R^1$ and $R^2$ may further include a nitrogen, oxygen, phosphorous, or halogen moiety. Exemplary compounds include ethyl butyrate, cinnamaldehyde, and benzaldehyde.

The second carbonyl containing compound is an aldehyde having the general formula:

wherein $R^3$ is a hydrogen or an alkyl group having from 1 to 6 carbons. $R^3$ may further include a nitrogen, oxygen, phosphorous, or halogen moiety. Exemplary aldehydes include, but are not limited to and acetaldehyde and formaldehyde.

The method of the application may be used in any situation where a corrodible metal is contact with an acid. Steel, for example, is a non-limiting example of such a metal. However, in some embodiments, the method will be employed in acid stimulation applications.

The corrosion inhibitors will include at least three components (four if the ammonium ions and iodide ions are counted as two) as set forth above The weight ratio of ammonium ion to iodide ion may vary widely, in some embodiments the ratio being from about 0.05:1 to about 10:1. The weight ratio of ammonium ion to carbonyl containing compounds may vary from about 0.002:1 to about 0.017:1. In some embodiments, the ratio will be from about 0.010:1 to about 0.014:1. In still other embodiments, the ratio will be from about 0.012:1 to about 0.014:1.

The ratio of the components in the corrosion inhibitor may also vary in accordance with their intended application. The operators of oil wells that may be treated with the corrosion inhibitors of the application may elect to adjust the ration of the individual components based upon their prior experience in treating the subject oil well.

The ratio of the first carbonyl containing compound to the second carbonyl containing compound may also vary. For example, in some embodiments, the weight ratio of the first carbonyl containing compound to the second carbonyl containing compound may be from 20:1 to about 1.5:1. In some embodiments, the ratio will be from about 10:1 about 1.5:1. In still other embodiments, the ratio will be from about 5:1 to about 2:1.

While the corrosion inhibitors of the present invention will have at least two different carbonyl containing compounds, they may have more. For example, in one embodiment, the corrosion inhibitor may have more than a single "first carbonyl containing compound." In another embodiment, there may be several aldehydes. In still another embodiment, the corrosion inhibitor may have mixture of compounds, more than one of which will meet the definition of the first carbonyl containing compound and more than one of which will meet the definition of the second carbonyl containing compound.

The concentration of the corrosion inhibitor in the stimulation fluid may also vary. For example, one basis for varying the concentration of the corrosion inhibitor may be downhole conditions. For example, in some embodiments, the downhole conditions may be very hot requiring a higher dosage of corrosion inhibitor than a comparatively cooler application. The concentration of corrosion inhibitor that may be useful with the method of the disclosure may be from about 30,000 ppm to about 20,000 ppm. In some embodiments, the concentration may be from about 10,000 ppm to about 1000 ppm. In still other embodiments, the concentration may be from about 1000 ppm to about 100 ppm.

In the acid stimulation methods, an acid is pumped downhole. In some embodiments, the corrosion inhibitor will be pumped downhole prior to the introduction of the acid. In other embodiments, the acid will be pumped downhole concurrently with the acid. In other embodiments, the corrosion inhibitor will be pumped down hole in two or more doses while in others the corrosion inhibitor will be introduced continuously throughout all or part of the stimulation process.

As mentioned, the corrosion inhibitor dosage may be subject to variation due to downhole temperature. The ammonium ion component of the corrosion inhibitor is most effective, as compared to other cations, at temperatures of from about 90 to about 5007. In some embodiments, the most effective temperature is from about 100 to about 300'F. In still other embodiments, the most effective temperature is from about 110 to about 250° F.

EXAMPLE

The following example is provided to illustrate certain embodiments of the disclosure. The example is not intended to limit the scope of the method of the disclosure and should not be so interpreted. Amounts are in weight parts or weight percentages unless otherwise indicated.

Example 1

A solution of 100 ml of 15% or 28% hydrochloric acid was prepared and to which was added 2.0 ml of a corrosion inhibitor having a composition including: cinnamaldehyde, formaldehyde, and benzaldehyde, isopropyl alcohol, $C_{14}$-$C_{15}$ alcohol with 10 moles of ethoxylation, and ammonium iodide. The solution was contacted with a metal and heated. The iodide source and temperature were varied. The corrosion loss for each solution was determined.

The corrosion loss determination in lb/ft$^2$ was made as follows. First, a coupon was cut from API N 80 steel oil field tubing and the surface area was determined. The coupon was weighed and placed in the acidic solution containing the inhibitor. The solution and coupon then was placed in an autoclave which was placed in a heating jacket preset to provide an autoclave temperature as shown in the Table and heated for six hours.

At the end of this time the coupon was removed, weighed and the corrosion loss calculated from the weight lost.

TABLE

| Sample ID | Iodide Source | 15% HCl 200° F. lb/ft$^2$ kg/m$^2$ | 15% HCl 225° F. lb/ft$^2$ kg/m$^2$ | 28% HCl 200° F. lb/ft$^2$ kg/m$^2$ | 28% HCl 225° F. lb/ft$^2$ kg/m$^2$ |
|---|---|---|---|---|---|
| Example | NH$_4$I | 0.004 0.020 | 0.009 0.044 | 0.006 0.030 | 0.077 0.376 |
| Control | No Iodide | 0.134 0.654 | 0.541 2.641 | 0.085 0.415 | 0.967 4.721 |
| Comp A | NaI | 0.008 0.039 | 0.083 0.405 | 0.009 0.044 | 0.465 2.270 |
| Comp B | KI | 0.008 0.039 | 0.108 0.527 | 0.013 0.063 | 0.505 2.466 |
| Comp C | (No Iodide) NH$_4$Cl | 0.015 0.073 | 0.071 0.347 | 0.362 1.767 | 0.856 4.179 |

The results clearly show that when ammonium iodide is used, the corrosion inhibitor is often an order of magnitude more effective than when the iodide is from a salt having a different cation and the control.

What is claimed is:

1. A method of acidizing an oil well comprising employing a corrosion inhibitor before, during or after an acid stimulation of the oil well, the corrosion inhibitor comprising: an Ammonium Iodide Ion Source; a first carbonyl containing compound selected from the group consisting of ethyl butyrate, cinnamaldehyde, benzaldehyde, and combinations thereof; and a second carbonyl containing compound selected from the group consisting of acetaldehyde, formaldehyde, and combinations thereof; and wherein the first carbonyl containing compound and the second carbonyl containing compounds are different.

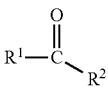

2. The method of claim 1 wherein the corrosion inhibitor is present in a stimulation fluid at a concentration of from about 30,000 ppm to about 100 ppm.

3. A method of acidizing an oil well comprising employing a corrosion inhibitor before, during or after an acid stimulation of the oil well, the corrosion inhibitor comprising: an Ammonium Iodide Ion Source; a first carbonyl containing compound selected from the group consisting of ethyl butyrate, cinnamaldehyde, benzaldehyde, and combinations thereof; and a second carbonyl containing compound selected from the group consisting of acetaldehyde, formaldehyde, and combinations thereof; and wherein the first carbonyl containing compound and the second carbonyl containing compounds are different;

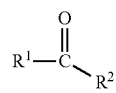

and wherein the oil well has a zone being treated at a temperature of from about 90 to about 500° F.

* * * * *